United States Patent
Bakos

(10) Patent No.: US 9,489,343 B2
(45) Date of Patent: Nov. 8, 2016

(54) SYSTEM AND METHOD FOR SPARSE MATRIX VECTOR MULTIPLICATION PROCESSING

(71) Applicant: Jason D. Bakos, Chapin, SC (US)

(72) Inventor: Jason D. Bakos, Chapin, SC (US)

(73) Assignee: University of South Carolina, Columbia, SC (US)

( * ) Notice: Subject to any disclaimer, the term of this patent is extended or adjusted under 35 U.S.C. 154(b) by 59 days.

(21) Appl. No.: 14/508,198

(22) Filed: Oct. 7, 2014

(65) Prior Publication Data

US 2015/0088954 A1    Mar. 26, 2015

Related U.S. Application Data

(63) Continuation of application No. 13/456,657, filed on Apr. 26, 2012, now Pat. No. 8,862,653.

(60) Provisional application No. 61/478,963, filed on Apr. 26, 2011.

(51) Int. Cl.
*G06F 7/38* (2006.01)
*G06F 17/16* (2006.01)

(52) U.S. Cl.
CPC .................................. *G06F 17/16* (2013.01)

(58) Field of Classification Search
CPC .......... G06F 7/5443; G06F 7/57; G06F 7/48; G06F 9/3001; G06F 2207/3828
USPC ........................................................ 708/490
See application file for complete search history.

(56) References Cited

U.S. PATENT DOCUMENTS 5,018,092 A    5/1991    Hashimoto
6,421,698 B1   7/2002    Hong

OTHER PUBLICATIONS deLorimier et al., "Floating-Point Sparse Matrix-Vector Multiply for FPGAs", Proc. 13$^{th}$ ACM./SIGDA Symposium on Field-Programmable Gate Arrays (FGPA 2005), pp. 75-85.
Gerards, University of Twente, The Netherlands, "Streaming Reduction Circuit for Sparse Matrix Vector Multiplication on FPGAs" Master Thesis, Aug. 15, 2008, pp. 2-65.
Sun et al., "Sparse Matrix-Vector Multiplication Design on FPGAs", 2007 International Symposium on Field-Programmable Custom Computing Machines, IEEE Computer Society, pp. 349-351.
Zhuo et al., High Performance Reduction Circuits Using Deeply Pipelined Operators on FPGAs,IEEE Trans. Parallel and Dist. Sys. vol. 18, No. 10 Oct. 2007, pp. 1377-1392.
Zhuo, et al., Sparse Matrix-Vector Multiplication in FPGAs, Proc. 13$^{th}$ ACM/SIGDA Symposium on Field Programmable Gate Arrays (FPGA 2005), pp. 63-74.

*Primary Examiner* — Tan V. Mai
(74) *Attorney, Agent, or Firm* — Dority & Manning, P.A.

(57) ABSTRACT

Systems and methods for sparse matrix vector multiplication (SpMV) are disclosed. The systems and methods include a novel streaming reduction architecture for floating point accumulation and a novel on-chip cache design optimized for streaming compressed sparse row (CSR) matrices. The present disclosure is also directed to implementation of the reduction circuit and/or processing elements for SpMV processing into a personality for the Convey HC-1 computing device.

8 Claims, 3 Drawing Sheets

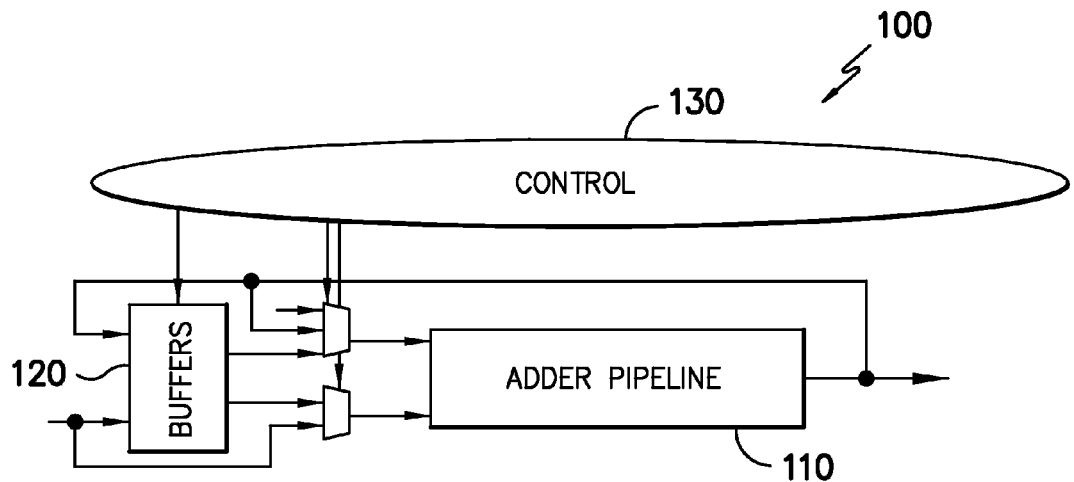
FIG. −1−
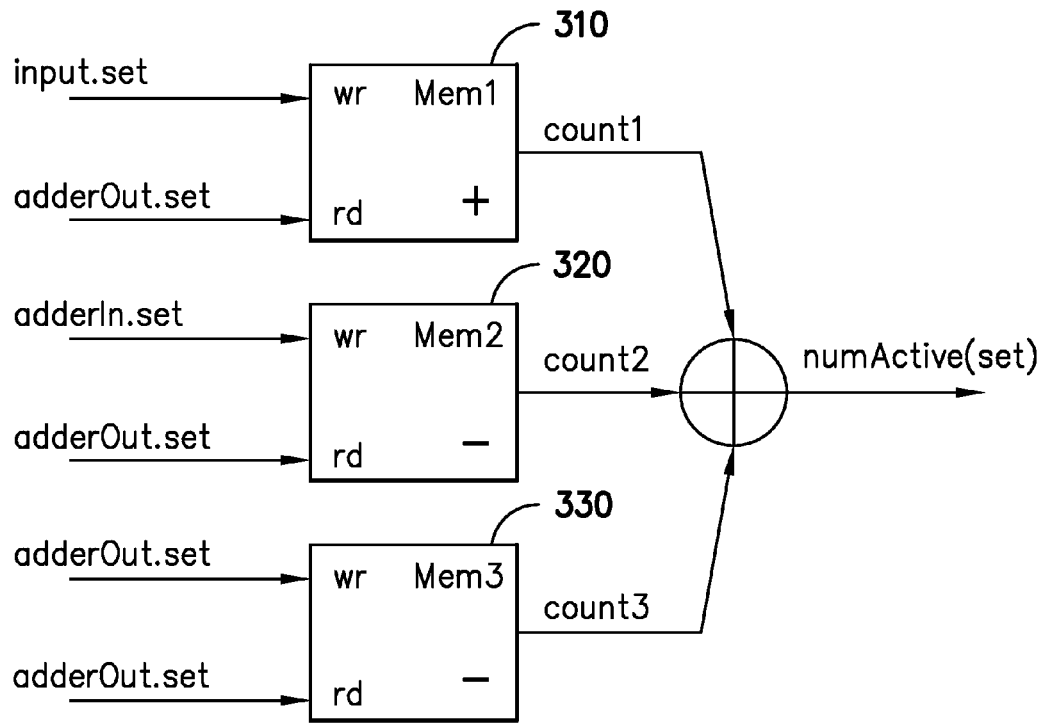
FIG. −3−

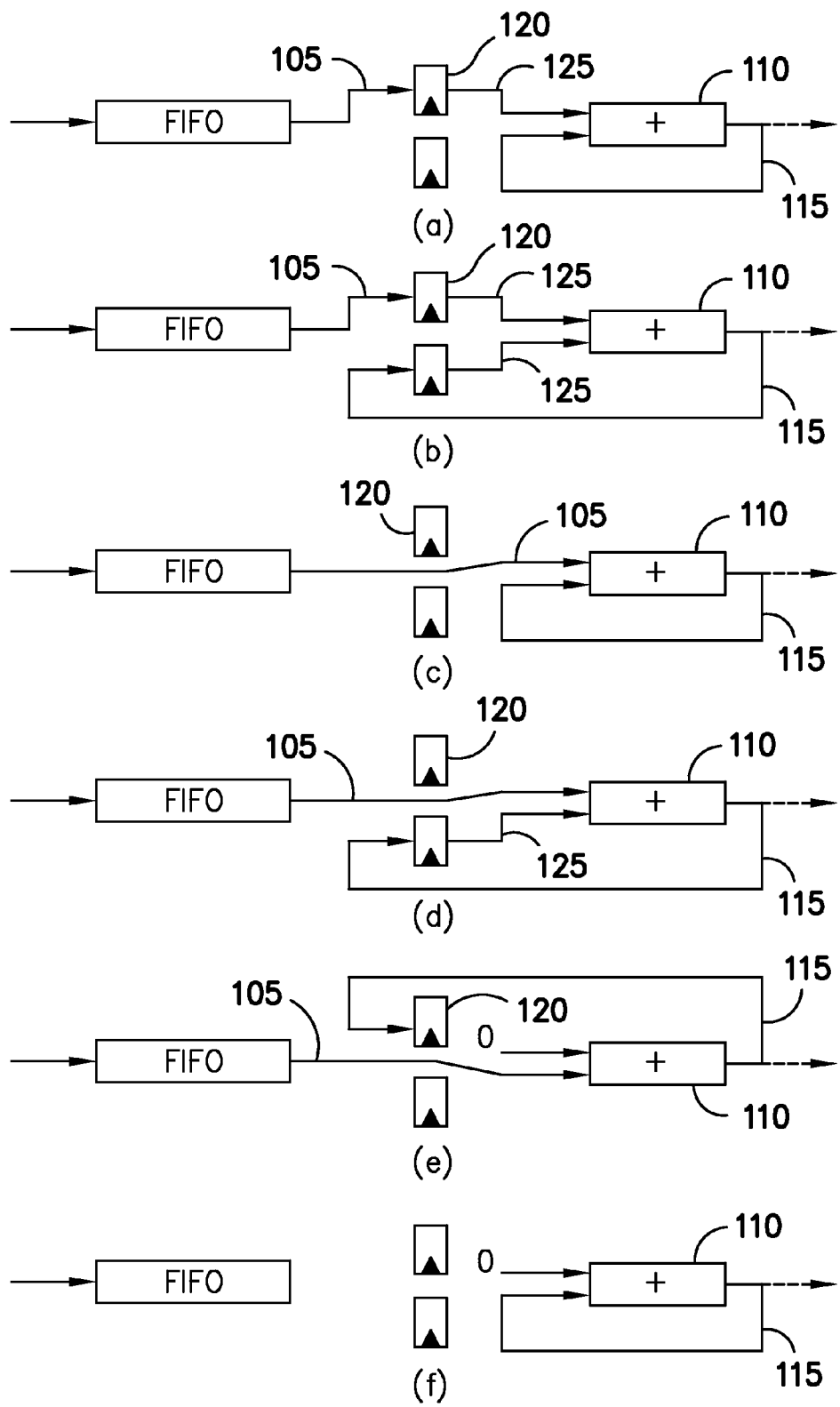
FIG. -2-

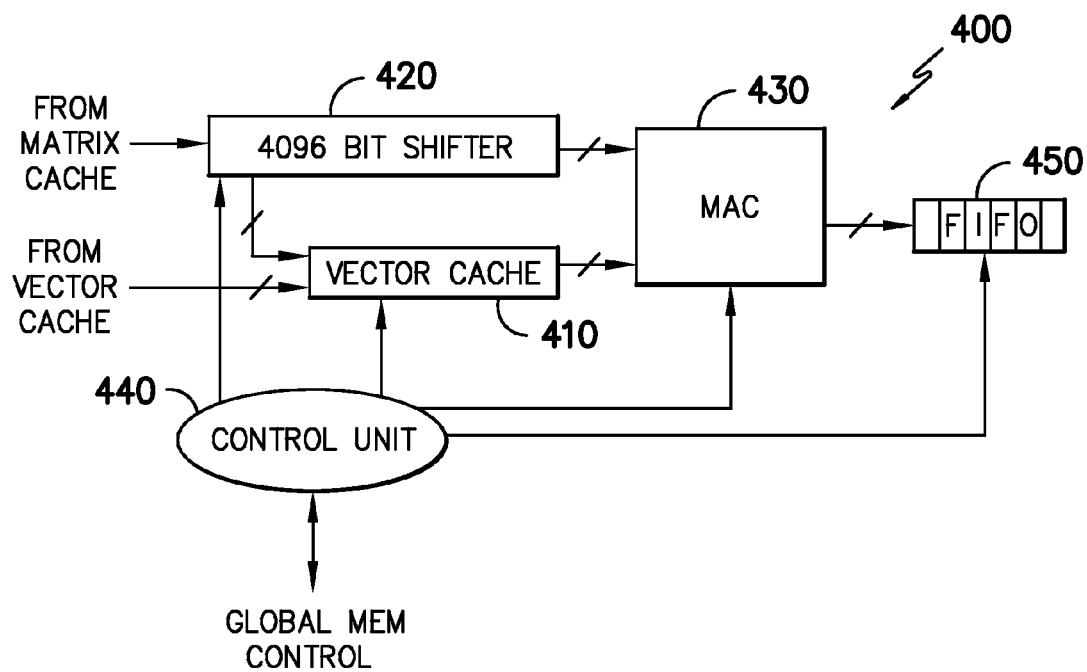
FIG. —4—
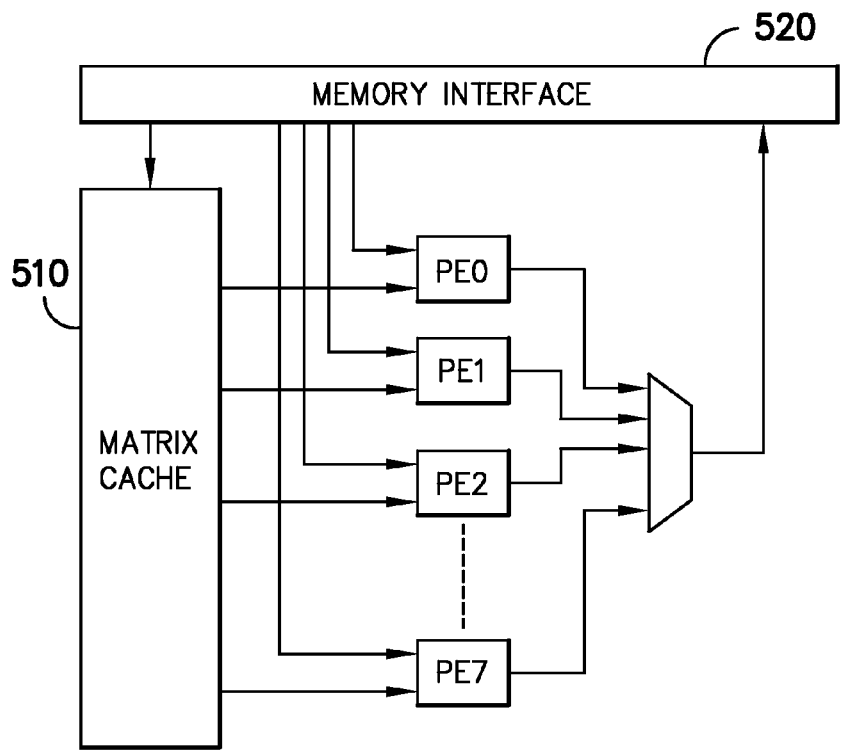
FIG. —5—

SYSTEM AND METHOD FOR SPARSE MATRIX VECTOR MULTIPLICATION PROCESSING

PRIORITY CLAIM

The present application is a continuation of U.S. patent application Ser. No. 13/456,657 having a filing date of Apr. 26, 2012 and claims the benefit of priority of U.S. Provisional Patent Application Ser. No. 61/478,963 filed Apr. 26, 2011 entitled System and Method for Sparse Matrix Vector Multiplication Processing, which is incorporated herein by reference for all purposes.

GOVERNMENT SUPPORT CLAUSE

This invention was made with government support under ccf-084495 awarded by the National Science Foundation. The government has certain rights in the invention.

BACKGROUND

The present disclosure relates generally to computer architecture and more particularly, to computer architecture optimized for sparse matrix vector multiplication processing.

Sparse Matrix Vector Multiplication (SpMV) describes solving y=Ax where y and x are vectors and A is a large matrix populated mostly with zero entries. SpMV is frequently employed in scientific and engineering applications and is the kernel for iterative linear system solvers such as the conjugant gradient method.

Due to the sparseness of matrices used in many scientific and engineering applications, it is often neither practical nor feasible to store every entry of the matrix in a traditional dense representation, so compressed sparse representations such as compressed sparse row (CSR) format are often used to represent the matrices in memory. The CSR format stores the non-zero elements in an array called val, the corresponding column numbers of an array called col, and the array indices of the first entry of each row in an array called ptr.

For example, the second non-zero value in row 4 would therefore be val[ptr[4]+1] and its corresponding column number in row 4 is col[ptr[4]+1]. Multiplying a CSR matrix by a vector stored in an array called vec requires a row-wise multiply accumulate (MAC) operation for each matrix row sum=sum+val[i]*vec[col[i]], where i iterates for each non-zero entry of the matrix. As shown in these examples, CSR computations fundamentally require indirect addressing, which cannot be expressed in an affine loop and therefore are difficult to automatically optimize for SIMD and vector processors.

In addition, SpMV architectures need only to perform two floating-point operations for each matrix value, yielding a computation/communication ratio of—at best—only two floating-point operations (FLOPs) per 12 bytes read, assuming a 64-bit value and a 32-bit column number, and this does not include input vector data. As such, performance is highly dependent on memory bandwidth. Achieving high memory bandwidth for long-latency DRAM-based memories often requires that consecutive input values be read in overlapping outstanding requests from consecutive locations in order to take advantage of banked memory. This access pattern is often referred to as streaming or coalesced memory access.

Since CSR stores values in a row-major consecutive memory locations, a third challenge for achieving high performance for SpMV comes from the need to accumulate values that are delivered to a deeply pipelined adder in consecutive clock cycles. This "streaming reduction operation" is often a design challenge in SpMV due to the deeply pipelined nature of floating point adders. In other words, a data hazard exists because subsequent additions on serialized products cannot be performed until the previous addition has completed. In order to overcome this data hazard, either data scheduling or architectural methods must be employed.

Due to the indirect addressing and streaming reduction challenges, previous implementations of SpMV, both in special-purpose hardware and software, often suffer from low hardware utilization.

Prior approaches to designing efficient SpMV architectures either assume that a copy of the entire input vector for each multiplier can be stored on chip or blocking techniques are used to perform the SpMV over multiple passes of the input matrix. However, in most cases, a critical aspect of each specific SpMV implementation is the approach taken in designing the floating-point accumulator.

Historically, there have been two basic approaches for designing high-performance double precision accumulators. The first approach is to statically schedule the input data in order to interleave values and partial sums from different rows such that consecutive values belonging to each row are delivered to the accumulator—which is designed as a simple feedback adder—at a period corresponding to the pipeline latency of the adder. This still allows the adder to accept a new value every clock cycle while avoiding the accumulation data hazard between values in the same accumulation set (matrix row). Unfortunately, this method requires a large up-front cost in scheduling input data and is not practical for large data sets.

An early example of the first approach was the work of deLorimier and DeHon. M. deLorimier, A DeHon, "Floating-point sparse matrix multiply for FPGAs," Proc. 13th ACM/SIGDA Symposium on Field-Programmable Gate Arrays (FPGA 2005). Their scheduling technique leads to the architecture's performance being highly dependent on the structure of the matrix, although on average they were able to achieve 66% of the peak performance in their simulation-based studies.

The second approach is to use a dynamic reduction technique that dynamically selects each input or partial sum to send into the adder—dynamically managing the progress of each active accumulation set using a controller. For the latter case, these approaches can be divided into two types depending on whether they use a single adder or multiple adders.

An early example using the dynamic reduction technique was from Prasanna's group at the University of Southern California as described in L. Zhou, V. K. Prasanna, "Sparse Matrix-Vector Multiplication on FPGAs," Proc. 13th ACM/SIGDA Symposium on Field Programmable Gate Arrays (FPGA 2005). In early variations of this technique, a linear array of adders was used to create a flattened binary adder tree, where each adder in the array was utilized at half the rate of the previous adder in the array. This required multiple adders with exponentially decreasing utilization, had a fixed maximum set size, and needed to be flushed between matrix rows.

The implementation from UT-Knoxville and Oak Ridge National Laboratory, described in J. Sun, G. Peterson, O. Storaasili, "Sparse Matrix-Vector Multiplication Design for FPGAs," Proc. 15 IEEE International Symposium on Field Programmable Computing Machines (FCCM 2007), used a similar approach but with a parallel—as opposed to a linear—array of n adders, where n was the adder depth. This implementation striped each consecutive input across each adder in turn, achieving a fixed utilization of 1/n for each adder.

Prasanna's group later developed two improved reduction circuits, called the double-strided adder (DSA) and single-strided adder (SSA), that solved many of the problems of Prassanna's earlier accumulator design. L Zhuo, V. K. Prasanna, "High-Performance Reduction Circuits Using Deeply Pipelined Operators on FPGAs," IEEE Trans. Parallel and Dist. Sys., Vol. 18, No. 10, October 2007. These new architectures required only two and one adders, respectively. In addition, they did not limit the maximum number of values that can be accumulated and did not need to be flushed between data sets. However, these designs did require a relatively large amount of buffer memory and extremely complex control logic.

An improved single-adder streaming reduction architecture was later developed at the University of Twente. M. Gerards, "Streaming Reduction Circuit for Sparse Matrix Vector Multiplication in FPGAs," Master Thesis, University of Twente, The Netherlands, Aug. 15, 2008. This design requires less memory and less complex control than Prassanna's SSA design.

Finally, in each of the above discussed works, pre-made adders (usually generated with Xilinx Core Generator) have been used as the core of the accumulator. Another approach is to modify the adder itself such that the de-normalization and significand addition steps have a single cycle latency, which makes it possible to use as a feedback without scheduling. To minimize the latency of denormalize portion, which includes an exponent comparison and a shift of one of the significands, both inputs are base-converted to reduce the width of exponent while increasing the width of the mantissa. This reduces the latency of the denormalize while increasing the adder width. Since wide adders can be achieved cheaply with DSP48 components, these steps can sometimes be performed in one cycle. This technique is best suited for single precision operands but can be extended to double precision as well. However, in general this approach requires an unacceptably long clock period.

Thus, a need exists for an SpMV architecture that overcomes the above-mentioned disadvantages. A new streaming reduction technique that requires substantially less memory and simpler control logic would be particularly useful.

SUMMARY

Aspects and advantages of the invention will be set forth in part in the following description, or may be obvious from the description, or may be learned through practice of the invention.

One exemplary embodiment of the present disclosure is directed to a reduction circuit for sparse matrix-vector multiplication (SpMV) processing. The reduction circuit includes an input configured to receive an incoming value of an accumulation set of a sparse matrix. The incoming value having an associated accumulation set id. The reduction circuit can further include an adder configured to sum input values provided to the adder and provide the summed value to an adder output. The reduction circuit can further include at least one buffer in operable communication with the input and the adder output. The at least one buffer can be configured to provide a buffered value to the adder. The reduction circuit can further include a plurality of data paths arranged to selectively deliver one or more of the incoming value, the buffered value, and the summed value to the adder and to the at least one buffer. The reduction circuit can include a controller configured to control delivery of the incoming value, the buffered value, and the summed value to the adder or to the at least one buffer based on an accumulation set id associated with one or more of the incoming value, the buffered value and the summed value. In a particular implementation, the accumulation set id can be based on the matrix row of the sparse matrix for purposes of computing a dot product.

In another particular implementation of this exemplary embodiment, the controller is configured to control the delivery of the incoming value, buffered value, and the adder output value to the adder or to the at least one buffer based at least in part on the following rules, in descending order of priority:

Rule 1: Provide the adder output value and buffered value to the adder. Provide the incoming value to the at least one buffer.

Rule 2: Provide two buffered values to the adder. Provide the incoming value to the at least one buffer.

Rule 3: Provide the incoming value and the adder output to the adder.

Rule 4: Provide the incoming value and a buffered value to the adder.

Rule 5: Provide the incoming value and a 0 input value to the adder.

More particularly, the controller can be configured to deliver the summed value and the buffered value to the adder and to deliver the incoming value to the at least one buffer when the summed value has the same accumulation set id as the at least one buffered value. The controller can be configured to deliver the first buffered value and the second buffered value to the adder and to deliver the incoming value to one of the first buffer or the second buffer when the first buffered value and the second buffered value have the same accumulation set id. The controller can be configured to deliver the summed value and the incoming value to the adder when the summed value has the same accumulation set id as the incoming value. The controller can configured to deliver the incoming value and the buffered value to the adder and to deliver the summed value to the at least one buffer when the incoming value has the same accumulation set id as the buffered value. The controller can be configured to provide the incoming value and a zero value to the adder when none of the incoming value, the first buffered value, the second buffered value, or the summed value have the same accumulation set id.

In another particular implementation of this exemplary embodiment, the input of the reduction circuit can be configured to receive a stream of incoming values associated with the accumulation set. The reduction circuit can be configured to perform a reduction operation on the stream of incoming values. The reduction circuit can be configured to provide a reduction circuit output, such as the summed value of the adder, when the stream of values is reduced to a single value. The controller can be configured to determine when the stream of values is reduced to a single value based at least in part on a sum of values provided by a plurality of memories storing information associated with the accumulation set.

Another exemplary embodiment of the present disclosure is directed to a processing element configured for sparse matrix-vector multiplication (SpMV) processing. The processing element includes vector cache, a shifter, a multiply accumulator (MAC), a controller, and a result FIFO. The shifter is configured to receive matrix data and provide serial output incoming values to the MAC. The vector cache is configured to hold a subset of the input vector. The vector cache provides data associated with a vector to the MAC. The MAC is configured to compute a dot product value from the matrix data and vector data and provide the dot product value and its corresponding set ID into the result FIFO. In a particular implementation of this exemplary embodiment, the MAC includes a reduction circuit having a controller configured to control the delivery of incoming values, buffered values, and adder output values to an adder pipeline or to at least one buffer based on an accumulation set id of the accumulation set associated with the matrix data.

In a further exemplary embodiment of the present disclosure, the reduction circuit and/or processing elements of the present disclosure are implemented as a personality for the Convey HC-1 computing device. For instance, in a particular embodiment, the reduction circuit and/or processing elements for sparse matrix-vector multiplication (SpMV) processing are implemented on user-programmable FPGAs associated with the Convey HC-1 computing device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts a block diagram of a reduction circuit according to an exemplary embodiment of the present disclosure;

FIG. 2 depicts various data routing configurations for a reduction circuit according to an exemplary embodiment of the present disclosure;

FIG. 3 depicts a block diagram of a system for tracking accumulation set ID for an accumulation set according to an exemplary embodiment of the present disclosure;

FIG. 4 depicts a block diagram of a processing element design according to an exemplary embodiment of the present disclosure; and FIG. 5 depicts a top level design for a sparse matrix vector multiplier according to an exemplary embodiment of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a floating point sparse matrix-vector multiplier (SpMV) that includes a novel streaming reduction architecture for floating point accumulation and a novel on-chip cache design optimized for streaming compressed sparse row (CSR) matrices. The present disclosure is also directed to integration of the reduction circuit and/or processing elements of the present disclosure into the Convey HC-1 computing device.

To simplify the SpMV controller design, a slightly modified version of CSR format is used to eliminate the use of the ptr array. CSR format stores a matrix in three arrays, val, col, and ptr. Val and col contain the value and corresponding column number for each non-zero value, arranged in a raster order starting with the upper-left and continuing column-wise left to right and then row-wise from top to bottom. The ptr array stores the indexes within val and col where each row begins, terminated with a value that contains the size of val and col.

Instead of using a ptr array, end-of-row information within the val and col arrays is encoded using zero termination. To mark the termination of a row, a 0 is used for both val and col values. This increases the length of arrays by the number of matrix rows and requires pre-processing of the matrix data. For applications such as iterative system solvers that invoke SpMV, the preprocessing step would only be a one-time upfront cost.

FIG. 1 illustrates a reduction circuit 100 according to an exemplary embodiment of the present disclosure. The reduction circuit 100 includes single floating-point adder 110, coupled to external buffers 120 and a controller 130 to dynamically schedule inputs to the adder 110. The following assumptions are made when describing operation of the reduction circuit 100:

(1) input values are delivered serially one per cycle;

(2) output order need not match the arrival order of accumulation sets;

(3) the accumulation sets are contiguous, meaning that values from different accumulation sets are not inter-mixed; and (4) the size of each accumulation set is variable and is not known a priori.

As FIG. 1 depicts, the reduction circuit 100 includes a controller 130 that has control logic in the form of comparators, counters, etc., and buffers 120 around a single adder 110 to form a dynamically scheduled accumulator. The accumulator architecture includes a set of data paths that allow input values and the adder output to be delivered into the adder or buffered, based on their corresponding accumulation set ID and the state of the system. In this case, the set ID represents the matrix row for the purpose of computing a dot product. Data paths are established by the controller 130 according to five basic rules:

Rule 1: Combine the adder pipeline output with a buffered value. Buffer the incoming value.

Rule 2: Combine two buffered values. Buffer the incoming value.

Rule 3: Combine the incoming value with the adder pipeline output.

Rule 4: Combine the incoming value with a buffered value.

Rule 5: Supply the incoming value with 0 to the adder pipeline.

To describe the rules in a more concise manner, the incoming input value to the accumulator is represented as input.value and input.set. Buffer n as bufn.value and bufn.set. The value emerging from the adder pipeline as adderOut.value and adderOut.set. The inputs to the adder pipeline addIn1 and addIn2 and the reduced accumulated sum as result.value and result.set. Also, we represent the number of partial sums belonging to set s as numActive(s). Using this notation, the rules are described below, in descending order of priority:

```
Rule 1
  if ∃n : buf_n.set = adderOut.set then
      addIn_1 := adderOut
      addIn_2 := buf_n
  end if
  if input.valid then
      buf_n := input
  end if
Rule 2
  if ∃i,j : buf_i.set = buf_j.set then
      addIn_1 := buf_i
      addIn_2 := buf_j
  end if
  if input.valid then
      buf_i := input
  end if
  if adderOut.valid and numActive(adderOut.set) = 1 then
      result := adderOut
  else if adderOut.valid then
      buf_j := adderOut
  end if
Rule 3
  if input.valid then
      if input.set = adderOut.set then
         addIn_1 := input
         addIn_2 := adderOut.set
      end if
Rule 4
  if input.valid then
    ∃n : buf_n.set = input.set then
         addIn_1 := input
         addIn_2 := bufn
    end if
    if adderOut.valid and numActive(adderOut.set) = 1 then
         result := adderOut
    else
         buf_n := adderOut
    end if
Rule 5
  if input.valid then
      addIn_1 := input
      addIn_2 := 0
  if adderOut.valid and numActive(adderOut.set) = 1 then
      result := adderOut
  else if ∃n : bufn.valid = 0 then
      buf_n := adderOut
  end if
```

FIG. 2 depicts variations of the reduction circuit 100 to implement these five rules. FIG. 2(a) illustrates the condition where the adder output 115 belongs to the same set at a buffered value 125. FIG. 2(b) illustrates the condition where two buffered values 125 belong to the same set. FIG. 2(c) illustrates the condition where the incoming value 105 and the adder output 115 belong to the same set. FIG. 2(d) illustrates the condition where the incoming value 105 and a buffered value 125 belong to the same set. FIG. 2(e) illustrates the condition where the incoming value 105 does not match the adder output 115 or any of the buffered values. FIG. 2(f) illustrates the condition where there is no incoming value.

Referring now to FIG. 3, three dual-ported memories 310, 320, and 330, each with a corresponding counter connected to the write port, are used to determine when a set ID has been reduced (accumulated) into a single value. Together, the memories 310, 320, and 330 track the number of active values belonging to each set in each cycle, i.e. numActive ( ).

The write port of each memory 310, 320, and 330 is used to increment or decrement the current value in the corresponding memory location. The write port of memory 310 is connected to input.set and always increments the value associated with this set ID corresponding to the incoming value.

The write port of the memory 320 is connected to adderIn.set and always decrements the value associated with this set ID whenever two values from this set enter the adder. This occurs under all rules except for Rule 5, since each of these rules implement a reduction operation.

The write port of the memory 330 is connected to adderOut.set and always decrements the value associated with this set ID whenever the number of active values for this set ID reaches one. In other words, this counter is used to decrement the number of active values for a set at the time when the set is reduced to single value and subsequently ejected from the reduction circuit.

The read port of each memory 310, 320, and 330 is connected to adderOut.set, and outputs the current counter value for the set ID that is currently at the output of the adder. These three values are added to produce the actual number of active values for this set ID. When the sum is one, the controller signals that the set ID has been completely reduced. When this occurs, the set ID and corresponding sum is output from the reduction circuit. Note that these memories must contain at least n locations, where n=the maximum possible number of active sets, in order to recycle locations in these memories.

The core of each processing element (PE) design is the double precision streaming multiply-accumulator (MAC). The MAC includes the reduction circuit-based accumulator 100 shown in FIG. 1 fed by a double-precision multiplier. During initialization, the host provides each PE with a initial row number, as well as a starting address in the matrix memory. This is method by which the host distributes the workload among all PEs. The MAC keeps track of which row is currently being processed by incrementing the row number each time a zero termination is read.

The MAC includes a FIFO for buffering incoming products between the multiplier and accumulator. The FIFO is used to hold products that cannot immediately enter the accumulator when all its buffers are full. The FIFO is given an opportunity to empty during zero termination cycles, cycles where matrix blocks are retrieved from the matrix cache (whose time can vary depending on cache contention among PEs—described below), and during matrix and vector cache misses. These idle cycles allow for a reduced number of buffers within the reduction circuit.

FIG. 4 depicts a block diagram of an exemplary PE 400 according to an exemplary embodiment of the present disclosure. The PE 400 includes a vector cache 410, a shifter 420, a MAC 430, a controller 440, and a result FIFO 450. During operation, the PE 400 streams matrix and vector data into the MAC 430.

In a particular implementation, a global, 64 KB on-chip matrix cache is subdivided into eight segments—one for each PE 400. As such, only half of this matrix cache is used in a half-populated design, but since there is no temporal locality in the matrix data (it is streamed), this does not affect performance. The cache is organized as 32×512×32

BRAMs. Each segment is reserved for a particular PE 400. Each segment holds 672 matrix values and their corresponding column number (val-col pairs), including the zero pairs used to terminate each matrix row.

The PE 400 loads consecutive blocks of matrix data from the matrix cache into shifter 420 that holds 42 val-col pairs, and then shifts each out serially. Since the matrix cache is shared among all PEs, only one PE 400 can read from it at any time. As such, access is arbitrated using fixed priority according to PE ID number. After each PE 400 has consumed all of the sixteen blocks of cached matrix data and held for it in the matrix cache (42 val-cols per block, 16 blocks =672 total val-cols), the PE 400 sends a request signal to the top-level global memory controller which reads a new segment into the matrix cache. During a cache miss, this line size insures that there are an equal number of reads from each SGDIMM forming the coprocessor memory.

The incoming stream of column numbers is used to index the input vector to obtain the value to be multiplied with the matrix value. Since this architecture is designed for multiplying large matrices, the entire input vector typically will not fit within on-chip memory for each PE 400. As such, vector cache 410 is designed to hold a subset of the input vector. Since the values in many sparse matrices exhibit spatial locality since they are typically clustered in nearly columns, the cache 410 is implemented as a traditional four-line direct mapped cache where each line holds 2048 consecutive double-precision values from the vector. In total the cache holds 8192 double-precision values. As with the matrix cache, during a cache miss there are an equal number of reads from each SGDIMM on the coprocessor memory.

The vector cache 410 is local to each PE 400 and vector data can thus be duplicated across an FPGA, depending on how the workload is distributed among the PEs 400. The top-level memory controller can only service one vector miss or matrix miss at any time.

A top level design is illustrated in FIG. 5. As shown, the shared matrix cache 510, each individual PE's 400 vector cache, and the result FIFOs all share access to the global memory controller 520. PE requests for vector and matrix cache misses, as well as result write requests, are serialized and arbitrated in one pool using a fixed-priority scheme according to PE ID number.

Each time the MAC 430 computes a result vector (dot product) value, the value and its corresponding set ID (i.e. row ID) are written into the PE's 400 result FIFO 450. The global memory controller 520 monitors the state of each PE's result FIFO 450 and writes any pending results to coprocessor memory as soon as any in-process matrix and vector misses have completed. The coprocessor memory address for each write is computed by adding the set ID, multiplied by eight, to the vector base address (which is written into all PEs by the host prior to execution). Result values are written to coprocessor memory using a fixed priority according to PE ID number. Result writes are given priority over cache misses, since they generally only require one cycle to complete while cache misses take substantially longer to service.

EXAMPLE

The subject matter of the above-referenced embodiments was implemented as a personality for Convey HC-1 computing device. In this section, specific issues related to the personality design will be set forth.

At Supercomputing 2009, Convey Computer unveiled the HC-1, their contribution to the space of socket-based reconfigurable computers. The HC-1 is unique in several ways. Unlike in-socket coprocessors from Nallatech, DRC, and XtremeData—all of which are confined to a footprint matching the size of the socket—Convey uses a mezzanine connector to bring the front side bus interface to a large coprocessor board roughly the size of an ATX motherboard. This coprocessor board is housed in a 1U chassis that is fused to the top of another 1U chassis containing the host motherboard.

The Convey HC-1 includes four user-programmable Virtex-5 LX 330s, which Convey calls "application engines (AEs)". Convey refers to a particular configuration of these FPGAs as a "personality". Convey licenses their own personalities and corresponding compilers, development tools, simulators, debuggers, and application libraries. Currently, this includes three soft-core vector processors and a Smith-Waterman sequence alignment personality. Convey has not yet developed a personality that is specifically designed for sparse matrix computations, nor do they currently provide a sparse BLAS library targeted to one of their vector personalities.

The four AEs are each connected to eight independent memory controllers through a full crossbar. Each memory controller is implemented on its own FPGA, and is connected to two Convey-designed scatter-gather DIMM modules. Each AE has a 2.5 GB/s link to each memory controller, and each SGDIMM has a 5 GB/s link to its corresponding memory controller. As a result, the effective memory bandwidth of the AEs is dependent on their memory access pattern. For example, each AE can achieve a theoretical peak bandwidth of 20 GB/s when striding across a minimum of eight DIMMs across eight different memory controllers, but this bandwidth could drop if two other AEs attempt to read from the same set of eight DIMMs since this would saturate the 5 GB/s DIMM-memory controller links. All four AEs can achieve an aggregate bandwidth of 80 GB/s when used together assuming a uniformly distributed access pattern across all DIMMs. For double-precision CSR SpMV, this gives a peak performance of 80 GB/s/(12 bytes/2 FLOPs)=~13 GFLOPs/s.

The most unique property of the HC-1 is that the coprocessor memory is coherent with the host memory, implemented using the snoopy coherence mechanism built into the Intel FSB protocol. This essentially creates a common global system virtual address space that both the host and coprocessor share, and this coherence is enforced in hardware transparently to the user hardware design and user software on both the host and coprocessor.

As in classical snoopy coherence protocols, in the HC-1 each virtual memory address may be in an invalid, exclusive, or shared state relative to both the host and coprocessor memory. Shared memory locations are guaranteed have identical contents on both host and coprocessor. Whenever a virtual memory location transitions from exclusive to shared, the contents of the memory are updated in the requestor's local memory. The coherence mechanism is transparent to the user and removes the need for explicit DMA negotiations and transactions (required for PCI-based coprocessors).

The coprocessor board contains two FPGAs that together form the "application engine hub (AEH)". One of these FPGAs serves as the coprocessor board's interface to the FSB, maintains the snoopy memory coherence protocol between the coprocessor and host memory, and manages the page table for the coprocessor memory. This FPGA is actually mounted to the mezzanine connector. The second AEH FPGA contains the "scalar processor", a soft-core processor that implements the base Convey instruction set. The scalar processor is a substantial general-purpose processor architecture, and includes a cache and features such as out-of-order execution, branch predication, register renaming, sliding register windows, and a virtualized register set. The scalar processor plays a significant role on the coprocessor because it is the mechanism by which the host invokes computations on the AEs. In Convey's programming model, the AEs act as coprocessors to the scalar processor (they implement custom instructions), while the scalar processor acts as coprocessor for the host CPU.

When using the Convey Personality Development Kit (PDK), code for the scalar processor is generally written by hand in Convey's own scalar processor assembly language. After assembly, the scalar processor code is linked into the host executable in a linker section named "ctext". On execution, scalar processor routines can be invoked from the host code by the synchronous and asynchronous "copcall" API functions. The host CPU can also use this mechanism to send parameters to and receive status information from the AEs (although this can also be achieved through the coherent global memory).

The scalar processor is connected to each AE via a point-to-point link, and uses this link to dispatch instructions to the AEs that are not entirely implemented on the scalar processor. Examples of such instructions include move instructions for exchanging data between the scalar processor and AEs, and custom AE instructions, which consist of a set of 32 "dummy" instructions that can be used to invoke user-defined behaviors on the AEs. Through the dispatch interface on the AE, logic on the AEs can also trigger exceptions and implement memory synchronization behaviors.

Designing custom personalities requires the use of the Convey PDK. The PDK is physically comprised of a set of makefiles to support simulation and synthesis design flows, a set of Verilog support and interface files, a set of simulation models for all the non-programmable components of the coprocessor board such as the memory controllers and memory modules, and a PLI-based interface to allow the host code to interface with a behavioral HDL simulator such as Modelsim.

Developing with the PDK involves working within a Convey-supplied wrapper that gives the user logic access to instruction dispatches from the scalar processor, access to all eight memory controllers, access to the coprocessor's management processor for debugging support, and access to the AE-to-AE links. However, the wrapper requires fairly substantial resource overheads: 66 out of the 288 18 Kb BRAMS and approximately 10% of the slices on each FPGA. Convey supplies a fixed 150 MHz clock to the user logic on each FPGA.

As discussed above, the HC-1 contains four user-programmable FPGAs, called the application engines (AEs). Each AE has an interface to eight memory controllers and each memory controller interface has two 64-bit wide ports on the system clock, corresponding to each clock edge for the DDR memory. When designing an on-chip cache, in order to take advantage of all available off-chip memory bandwidth, enough BRAMs must be instanced to consume 8*2*64=1024 bits in a single clock cycle. At minimum BRAM depth (512), this yields a minimum of 16 512×36 BRAMs for each vector cache and the matrix cache, requiring 144 BRAMs to support the fully populated (8 PE) AE design and 80 BRAMS to support the half populated AE design. Since the Convey-designed memory controller interfaces themselves require an overhead of 66 BRAMs, scaling the design past 8 PEs is probably not possible (although there are enough BRAMs to implement a 12 PE design, this would likely place too much routing pressure on the interconnect fabric).

Table 1 summarizes the resource usage of our AE design, as well as the place and route time. As shown, BRAM and slice usage scale almost identically, while DSP usage is low in comparison.

TABLE 1

| Resource Utilization | | | | |
|---|---|---|---|---|
| Application Engine | Slices | BRAM | DSP48E | P & R CPU Time |
| 4 PE per AE | 26,055/51,840 (50%) | 146/288 (51%) | 48/192 (25%) | 11 hours |
| 8 PE per AE | 38,225/51,840 (73%) | 210/288 (73%) | 96/192 (50%) | ? |

Parallelizing the SpMV operation is relatively straightforward. Since all matrix rows can be processed independently, each PE is assigned an equal workload by dividing the set of matrix rows into equal-sized sets and distributing each set to the PEs across all four AEs. To do this, the host sends a matrix base address to each PE that specifies the starting location in the matrix data, as well as a starting row number and the number of rows to process before completion. Each PE, through its vector cache has access to the entire input vector, but each PE will only write to a disjoint section of the output vector.

GPUs have become a popular platform for accelerating scientific applications, particularly data parallel floating-point kernels such as computational fluid dynamics, ODE/PDE-based simulation, and medical imaging. However, due to the challenges with working with compressed sparse matrices described above, achieving high performance on GPU architectures for CSR-formatted sparse matrix arithmetic remains an open problem for which efforts are still in progress by both NVIDIA and third parties. In addition, there is a still a substantial gap between single and double precision floating point performance, even on current generation GPUs (although this gap appears to be closing over subsequent generations of GPU architectures). According to NVIDIA, there was a 10× performance gap between single and double precision performance on Tesla GPUs and a 5× performance gap on Fermi GPUs.

NVIDIA's CUDA CUSPARSE library on a Tesla S1070 were used to measure GPU performance of the test matrices. CUSPARSE supports sparse versions of basic linear algebra subroutines (BLAS) for a variety of sparse matrix representations, including CSR. CUSPARSE, as opposed to other third-party CUDA-based sparse matrix libraries, was used since CUSPARSE is the official de facto library endorsed by NVIDIA. Although the Tesla-S1070 consists of four GPUs, but CUSPARSE has been designed to run only on a single GPU even when multiple GPUs are available to the host.

A set of test matrices were chosen from Matrix Market and the University of Florida Matrix Collection. The matrices were chosen to cover a wide range of matrix orders, total number of nonzero entries, and average number of nonzero values per matrix row (sparseness). The test matrices are summarized in Table 2, along with the corresponding throughput achieved with CUSPARSE and the HC-1. Throughput is computed as $2*nz/(\text{execution time})$, where the execution time is measured without including transfer time between host memory and coprocessor memory.

TABLE 2

Experimental Results, NVIDIA CUSPARSE on Tesla vs. Half-populated HC-1

| Matrix | Application | r * c | nz | nz/row | CUSPARSE GFLOPs/s | HC-1 16 PE GFLOPs/s |
|---|---|---|---|---|---|---|
| dw8192 | Electromagnetics | 8192 * 8192 | 41746 | 5.10 | 0.49 | 1.71 |
| deter3 | Linear programming | 7647 * 21777 | 44547 | 5.83 | 0.44 | 0.28 |
| t2d_q9 | Structural | 9801 * 9801 | 87025 | 8.88 | 0.94 | 2.07 |
| epb1 | Thermal | 14734 * 14734 | 95053 | 6.45 | 0.80 | 2.18 |
| fome13 | Linear programming | 48568 * 97840 | 285056 | 5.87 | 0.82 | 0.19 |
| raefsky1 | Computational fluid dynamics | 3242 * 3242 | 294276 | 90.77 | 2.59 | 2.94 |
| psmigr_2 | Economics | 3140 * 3140 | 540022 | 171.98 | 2.83 | 2.84 |
| torso2 | 2D model of a torso | 115967 * 115967 | 1033473 | 8.91 | 3.00 | 1.06 |

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A pipelined reduction circuit comprising:
an input configured to receive a stream of incoming values, each incoming value in the stream of incoming values belonging to a set of incoming values, each incoming value having an associated set id;
a reduction operator configured to reduce a plurality of the sequence of incoming values in each set to a single reduced value, the reduced value being provided to a reduction operator output;
a first buffer configured to provide a first buffered value to the reduction operator and a second buffer configured to provide a second buffered value to the reduction operator;
a plurality of data paths arranged to selectively deliver one or more of the sequence of incoming values, the first buffered value, the second buffered value and a partially reduced value to the reduction operator, the first buffer, and the second buffer, wherein the partially reduced value corresponds to the reduction operator output; and
a controller configured to dynamically schedule delivery of the incoming value, the first buffered value, the second buffered value and the partially reduced value to the reduction operator or to one or both of the first buffer and second buffer based on the set id associated with one or more of the incoming value, the first buffered value, the second buffered value and the partially reduced value, wherein the controller comprises control logic components to form an accumulator architecture that configure the plurality of data paths to implement the dynamic scheduling based on the set id and a set of rules defined relative to the set ID.

2. The reduction circuit of claim 1, wherein the controller is configured to dynamically schedule delivery of the incoming value, the first buffered value, the second buffered value, and the partially reduced value according to a set of rules, the set of rules comprising in order of priority:
the partially reduced value and the first buffered value are delivered to the reduction operator and the incoming value is delivered to the first buffer when the reduction operator output has the same set id as the first buffered value;
the first buffered value and the second buffered value are delivered to the reduction operator, the incoming value is delivered to the first buffer, and the partially reduced value is delivered to the second buffer when the first buffered value and the second buffered value have the same set id;
the partially reduced value and the incoming value are delivered to the adder when the partially reduced value has the same set id as the incoming value;
the incoming value and the first buffered value are delivered to the reduction operator and the partially reduced value is delivered to the first buffer when the incoming value has the same set id as the first buffered value;
the incoming value and a zero value are delivered to the reduction operator and the partially reduced value is delivered to one of the first buffer or second buffer when none of the incoming value, the first buffered value, the second buffered value, or the summed value have the same set id.

3. The reduction circuit of claim 1, wherein the stream of incoming values comprises a sparse matrix.

4. The reduction circuit of claim 1, wherein the set id is based on the matrix row of the sparse matrix.

5. The reduction circuit of claim 1, wherein the controller is configured to determine when the stream of incoming values is reduced to a single value based at least in part on a sum of values provided by a plurality of memories storing information associated with the set of incoming values.

6. The reduction circuit of claim 5, wherein the plurality of memories comprises a first dual ported memory, a second dual ported memory, and a third dual ported memory, each of the first dual ported memory, the second dual ported memory, and the third dual ported memory having a write port.

7. The reduction circuit of claim 6, wherein the write port of the first dual ported memory is configured to track the introduction of new incoming values from the set of incoming values, the write port of the second dual ported memory is configured to track the reduction of incoming values occurring within the set, and the write port of the third dual ported memory is configured to track the ejection of a final reduced value associated with the set.

8. The reduction circuit of claim 6, wherein each of the first dual ported memory, the second dual ported memory, and the third dual ported memory have a read port, wherein values provided by the read ports of the first dual ported memory, the second dual ported memory, and the third dual ported memory are summed to provide a summed value, the controller configured to determine when the stream of incoming values is reduced to a single value based at least in part when the summed value reaches one.

* * * * *